United States Patent
Brown et al.

(10) Patent No.: US 7,367,424 B2
(45) Date of Patent: May 6, 2008

(54) ECCENTRIC EXHAUST MUFFLER FOR USE WITH AUXILIARY POWER UNITS

(75) Inventors: Daniel V. Brown, Surprise, AZ (US); Kyle D. Asplund, Wichita, KS (US); Joseph W. Michalski, Jr., Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 259 days.

(21) Appl. No.: 11/198,443

(22) Filed: Aug. 5, 2005

(65) Prior Publication Data

US 2006/0180388 A1    Aug. 17, 2006

Related U.S. Application Data

(60) Provisional application No. 60/652,951, filed on Feb. 14, 2005.

(51) Int. Cl.
*F01N 1/02* (2006.01)
*F01N 1/08* (2006.01)
*F01N 1/00* (2006.01)
*F01N 1/10* (2006.01)

(52) U.S. Cl. .................. 181/250; 181/266; 181/273; 181/276; 181/249; 181/255; 181/272

(58) Field of Classification Search .............. 181/250, 181/266, 273, 276, 249, 255, 269, 272, 270
See application file for complete search history.

(56) References Cited

U.S. PATENT DOCUMENTS

| | | | |
|---|---|---|---|
| 1,811,762 A * | 6/1931 | Schnell .................. 181/248 |
| 2,088,296 A * | 7/1937 | Riethmiller ............... 181/250 |
| 2,357,792 A * | 9/1944 | Powers .................... 181/250 |
| 2,909,235 A | 10/1959 | Beranek | |
| 2,988,302 A | 6/1961 | Smith | |
| 3,113,635 A * | 12/1963 | Allen et al. .............. 181/252 |
| 3,371,744 A * | 3/1968 | Straw ..................... 181/250 |
| 3,791,483 A * | 2/1974 | Vasiljevic ................ 181/252 |
| 3,955,643 A * | 5/1976 | Clark ..................... 181/248 |
| 4,091,892 A * | 5/1978 | Hehmann et al. ........... 181/286 |
| 4,109,754 A * | 8/1978 | Purhonen ................. 181/252 |
| 4,137,992 A | 2/1979 | Herman | |
| 4,244,441 A * | 1/1981 | Tolman ................... 181/213 |
| 4,314,621 A * | 2/1982 | Hansen ................... 181/233 |
| 4,979,587 A * | 12/1990 | Hirt et al. ............... 181/213 |
| 5,152,366 A * | 10/1992 | Reitz .................... 181/249 |

(Continued)

*Primary Examiner*—Edgardo San Martin
(74) *Attorney, Agent, or Firm*—Ingrassia Fisher & Lorenz

(57) ABSTRACT

A muffler system is provided for use with an auxiliary power unit. In one embodiment, and by way of example only, the system includes an outer can, an annular baffle, and a tube. The outer can has a sidewall including a forward end, an aft end, and a cavity extending therebetween. The sidewall is disposed about a first longitudinal axis, and the cavity has a first cross-sectional area and a smaller second cross-sectional area. The annular baffle is coupled to and extends radially inward from the outer can sidewall and has an opening that is disposed about a second longitudinal axis that is non-coincident with the first longitudinal axis. The tube extends through the annular baffle opening and is spaced apart from the annular baffle to define a radial gap therebetween, comprises acoustic material, and has a length and a substantially uniform cross-sectional area along the length.

20 Claims, 4 Drawing Sheets

U.S. PATENT DOCUMENTS

| | | |
|---|---|---|
| 5,162,620 A | 11/1992 | Ross et al. |
| 5,726,398 A * | 3/1998 | Zahn et al. ............... 181/282 |
| 5,955,707 A * | 9/1999 | Fritz ........................ 181/282 |
| 6,116,377 A * | 9/2000 | Dugan ...................... 181/272 |
| 6,220,387 B1 * | 4/2001 | Hoppes et al. ............ 181/259 |
| 6,308,915 B1 | 10/2001 | Liston et al. |
| 6,508,219 B2 * | 1/2003 | Schorn ................. 123/184.57 |
| 6,615,576 B2 | 9/2003 | Sheoran et al. |
| 6,672,424 B2 | 1/2004 | Gadefait et al. |
| 6,681,888 B2 | 1/2004 | Lepoutre |
| 6,695,094 B2 | 2/2004 | Moffat et al. |
| 6,935,834 B2 * | 8/2005 | Lata Perez ................ 415/115 |
| 6,983,820 B2 * | 1/2006 | Boast et al. ............... 181/249 |
| 2002/0153197 A1 | 10/2002 | Cummings et al. |

* cited by examiner

ECCENTRIC EXHAUST MUFFLER FOR USE WITH AUXILIARY POWER UNITS

CROSS-REFERENCES TO RELATED APPLICATIONS

This application claims the benefit of U.S. Provisional Application No. 60/652,951, filed Feb. 14, 2005.

TECHNICAL FIELD

The present invention relates to aircraft and, more particularly, to mufflers for use on aircraft.

BACKGROUND

Auxiliary power units ("APU") are used in aircraft to provide electrical power and compressed air to various parts therein. When an aircraft is on the ground, its main source of electrical power comes from the APU. In particular, the APU can power the electrical systems, environmental control systems, air drive hydraulic pumps, and the starters for the engines. When an aircraft is in flight, the APU may provide pneumatic and/or electric power to the aircraft.

Typically, an APU is located in the aft section of the aircraft, at or near the tailcone section. The APU is coupled to exhaust ducting that exits through an opening in the aircraft fuselage to allow sufficient air flow therethrough. Additionally, the exhaust ducting may be used to evacuate gases that may be exhausted from the APU, provide cooling air to the APU via an eductor system, and allow exit of APU exhaust noises from the aircraft.

As acceptable noise threshold levels have decreased, more APU exhaust ducting configurations have included noise attenuation devices, such as mufflers. Although current mufflers effectively suppress noise, they suffer certain drawbacks. For example, high temperature gases are typically exhausted from the APU which can cause the muffler to expand. However, many conventional mufflers do not suitably account for this expansion causing the structural integrity thereof to potentially become compromised. Additionally, some mufflers may not have a sufficient volume or optimize use of existing volumes to dampen APU noise to acceptable levels.

Therefore, there is a need for a muffler system that is capable of expanding in the aircraft in response to heat contact. There is also a need for a muffler system that optimizes available damping volume to dampen APU noise. The present invention addresses one or more of these needs.

BRIEF SUMMARY

The present invention provides a muffler system. In one embodiment, and by way of example only, the system includes an outer can, an annular baffle, and a tube. The outer can has a sidewall including a forward end, an aft end, and a cavity extending therebetween. The sidewall is disposed about a first longitudinal axis, and the cavity has a first cross-sectional area and a smaller second cross-sectional area. The annular baffle is coupled to and extends radially inward from the outer can sidewall and has an opening that is disposed about a second longitudinal axis that is non-coincident with the first longitudinal axis. The tube extends through the annular baffle opening and is spaced apart from the annular baffle to define a radial gap therebetween, comprises acoustic material, and has a length and a substantially uniform cross-sectional area along the length.

In another embodiment, and by way of example only, a muffler system for use with an auxiliary power unit ("APU"). The muffler system includes an outer can, an annular baffle, and a tube. The outer can has a sidewall, a forward annular wall, an aft annular wall, and a cavity extending between the forward annular wall and the aft annular wall. The sidewall is disposed about a first longitudinal axis and has a first section and a second section. The forward annular wall extends radially inward from the sidewall first section and includes an opening formed therein that is disposed about a second longitudinal axis. The second longitudinal axis is non-coincident with the first longitudinal axis. The aft annular wall extends radially inward from the sidewall second section and includes an opening formed therein that is disposed about the second longitudinal axis. The cavity has a first cross-sectional area and a second cross-sectional area that is smaller than the first cross-sectional area. The annular baffle extends radially inward from the outer can sidewall and is disposed between the forward annular wall and the aft annular wall. The baffle has an opening disposed about the second longitudinal axis. The tube extends through the annular baffle opening and is spaced apart from the annular baffle to define a radial gap therebetween. The tube comprises acoustic material and has a length and a substantially uniform cross-sectional area along the length.

In still another embodiment, and by way of example only, the system includes an outer can, a forward annular wall, an aft annular wall, an annular baffle, and a tube. The outer can has a sidewall disposed about a first longitudinal axis. The sidewall has a forward end, an aft end, and a cavity extending therebetween. The cavity has a first cross-sectional area and a second cross-sectional area that is smaller than the first cross-sectional area. The forward annular wall is coupled to and extends radially inward from the outer can sidewall. The forward annular wall has an opening that is disposed about a second longitudinal axis and the second longitudinal axis is non-coincident with the first longitudinal axis. The aft annular wall is coupled to and extending radially inward from the outer can sidewall and has an opening that is disposed about the second longitudinal axis. The annular baffle is coupled to and extends radially inward from the outer can sidewall, is disposed between the forward annular wall and the aft annular wall, and has an opening that is disposed about the second longitudinal axis. The tube extends through the annular baffle opening and is spaced apart from the annular baffle to define a radial gap therebetween. The tube comprises acoustic material and has a length and a substantially uniform cross-sectional area along the length.

Other independent features and advantages of the preferred system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
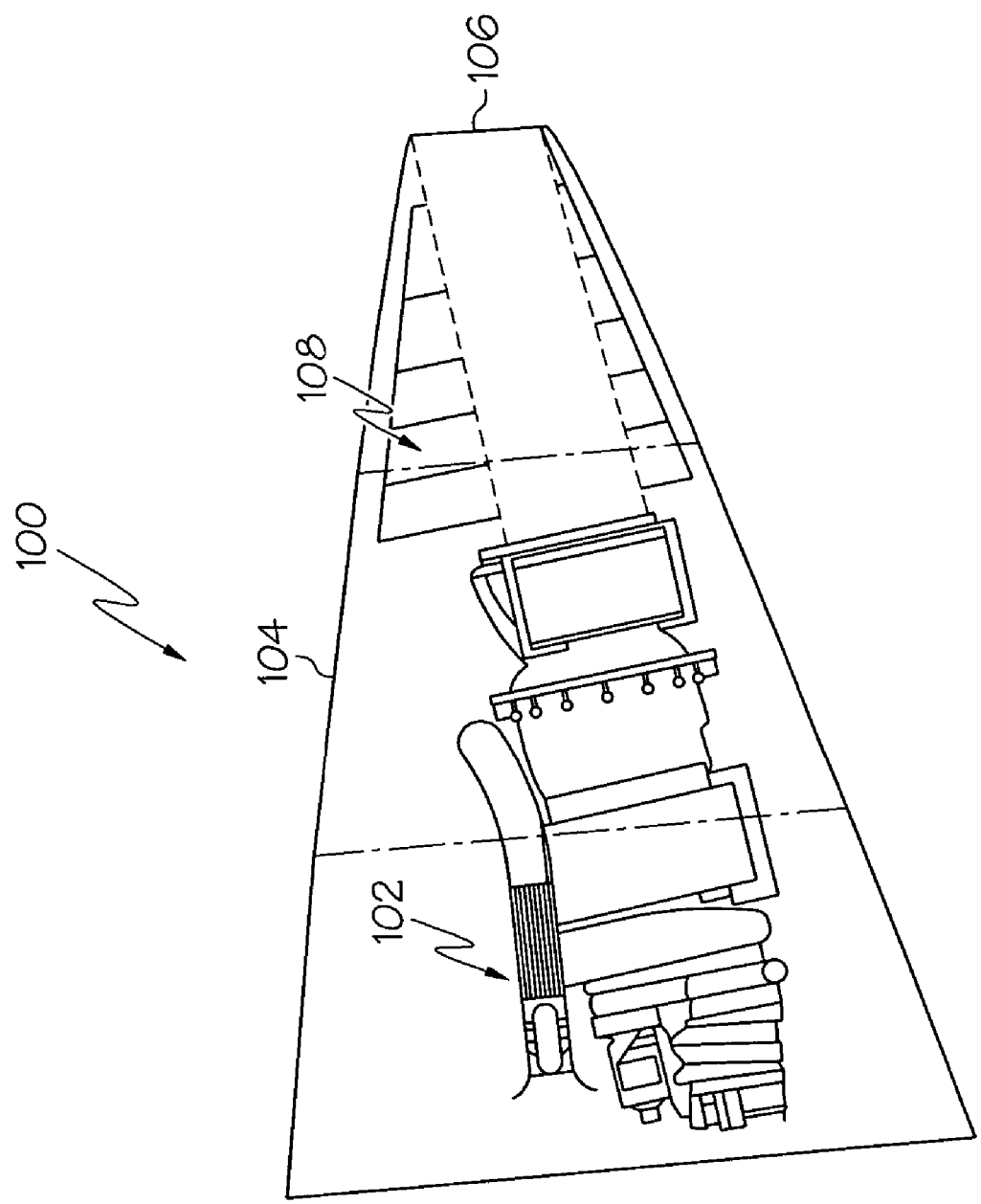
FIG. 1 is a cross-sectional view of an aircraft tailcone including an exemplary muffler system disposed therein.

Turning now to the description, FIG. 1 illustrates an aircraft tailcone 100 within which an auxiliary power unit ("APU") 102 is disposed. The tailcone 100 is generally conical and has a sidewall 104 and an exhaust opening 106 that is formed in a portion of the sidewall 104. The APU 102 communicates with the exhaust opening 106 to thereby exhaust gases or noise therethrough.

To reduce noise emissions from the APU 102, a muffler system 108 is disposed between the APU 102 and exhaust opening 106. A close-up view of the muffler system 108 is provided in FIG. 2. The muffler system 108 includes an outer can 110 and a tube 112 that extends through the outer can 110. The outer can 110 is configured to attenuate noise that is emitted by the APU 102 and includes a sidewall 114, a forward wall 116, and an aft wall 118. Alternatively, the muffler system 108 may include one or more annular baffles 122, 124, 126 (shown in FIG. 4).

Figure 2:
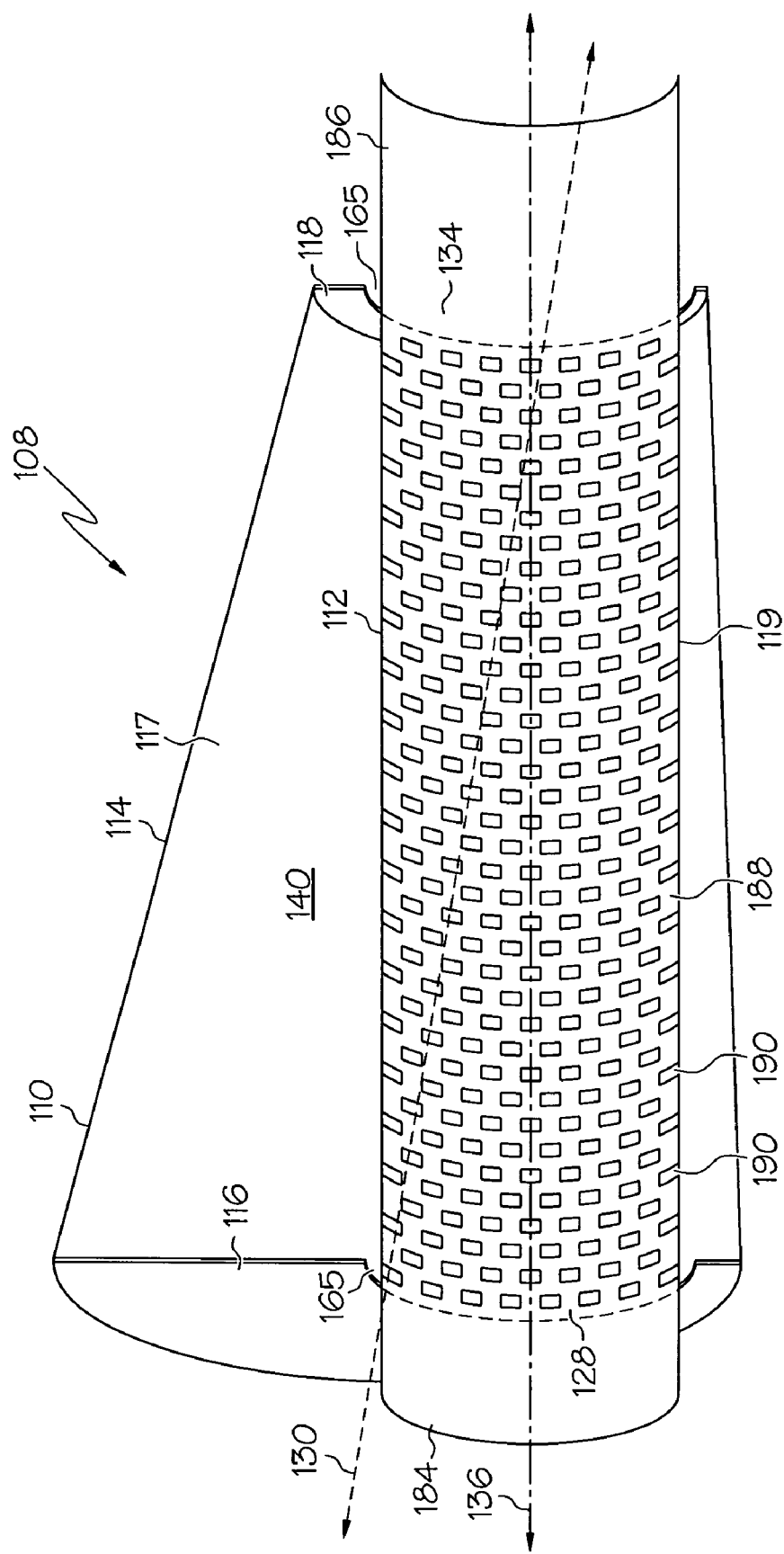
FIG. 2 is a cross-sectional perspective view of the exemplary muffler system.

The outer can sidewall 114 defines a cavity 117 that extends between the forward end and aft end of the sidewall 114. The sidewall 114 is preferably conical; however, it will be appreciated that the sidewall 114 may have any other suitable alternative configuration. In one exemplary embodiment, the sidewall 114 is disposed about a first longitudinal axis 130 that extends therethrough. The sidewall 114 may be disposed symmetrically or, as shown in FIG. 2, asymmetrically about the first longitudinal axis 130. In either case, the sidewall cavity 117 preferably has a first cross-sectional area in a forward portion thereof that is greater than a second cross-sectional area in an aft portion thereof.

The forward wall 116 extends radially inward from the sidewall 114 proximate its forward end and includes an opening 128. The opening 128 is disposed about a second longitudinal axis 136 that does not coincide with the first longitudinal axis 130. The aft wall 118 extends radially inward from the sidewall 114, preferably proximate its aft end. Similar to the forward wall 116, the aft wall 118 includes an opening 134 formed therein that is disposed about the second longitudinal axis 136.

The tube 112 is configured to direct APU 120 noise to the exhaust opening 106 and cooperates with the outer can 110 to attenuate noise as it travels therethrough. In this regard, the tube 112 is disposed within the sidewall cavity 117 and extends through the forward wall opening 128 and aft wall opening 134. Each of the forward wall opening 128 and aft wall opening 134 is configured to accommodate the tube 112.

As shown in FIG. 2, the tube 112 preferably includes three segments, an entrance pipe 184, an exit pipe 186, and an acoustic liner 188 interposed therebetween. The entrance pipe 184 and exit pipe 186 are preferably disposed external to the outer can 114. The acoustic liner 188 is preferably positioned between the forward wall 116 and aft wall 118 and is constructed of acoustic material that has a resistance of greater than zero. It will be appreciated that any one of numerous suitable acoustic materials may be employed, such as, for example, perforated metal, fiber metal, or any other porous material. In any event, the acoustic liner 188 includes a plurality of openings 190 formed therein that allows noise to travel therethrough.

The tube 112 has a substantially uniform cross-sectional area along its length and includes an outer surface 119 that, together with the forward wall 116, aft wall 118, and the outer can sidewall 114, defines an acoustic chamber 140. Thus, when noise travels through the acoustic liner 188 section of the tube 112, the noise travels through the openings 190 into the chamber 140 and is attenuated through viscous effects. Specifically, the varying cross-sectional area of the outer can cavity 117 cooperates with the acoustic liner 188 to provide broadband acoustic tuning. In addition, the change in cross-sectional area from the forward end of the outer can 110 to its aft end provides a beneficial change in acoustic impedance that further reduces exhaust noise.

Figure 3:
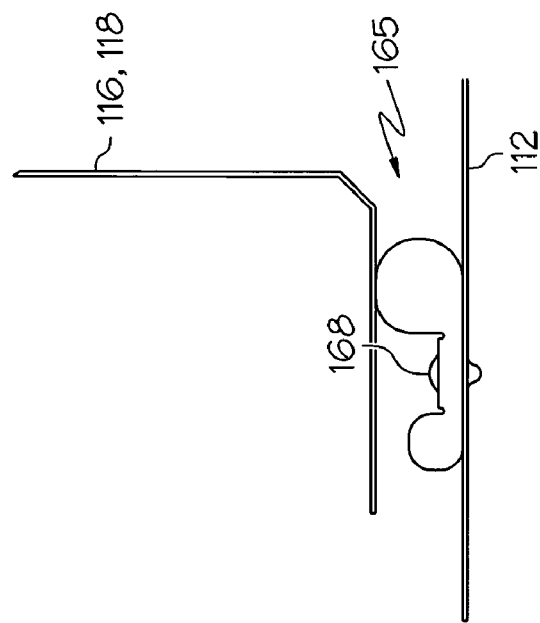
FIG. 3 is a close-up view of a section of an exemplary wall that may be used with the muffler system depicted in FIG. 2.

The tube 112 is spaced apart from the forward wall 116 and aft wall 118, thereby defining radial gaps 165 therebetween, as shown in FIG. 2. The radial gaps 165 are configured to allow the tube 112 to radially expand during exposure to heat from the APU 120 exhaust gases. In an alternate embodiment, a compressible seal 168 may be disposed in the radial gap 166 to maintain a distance between the tube 112 and the walls 116, 118 as shown in FIG. 3. The compressible seal 168 may be any type of conventionally used seal capable of withstanding the temperatures of the APU 120 exhaust gases. The compressible seal 168 may be coupled to one or more of the tube 112 and the walls 116, 118.

Figure 4:
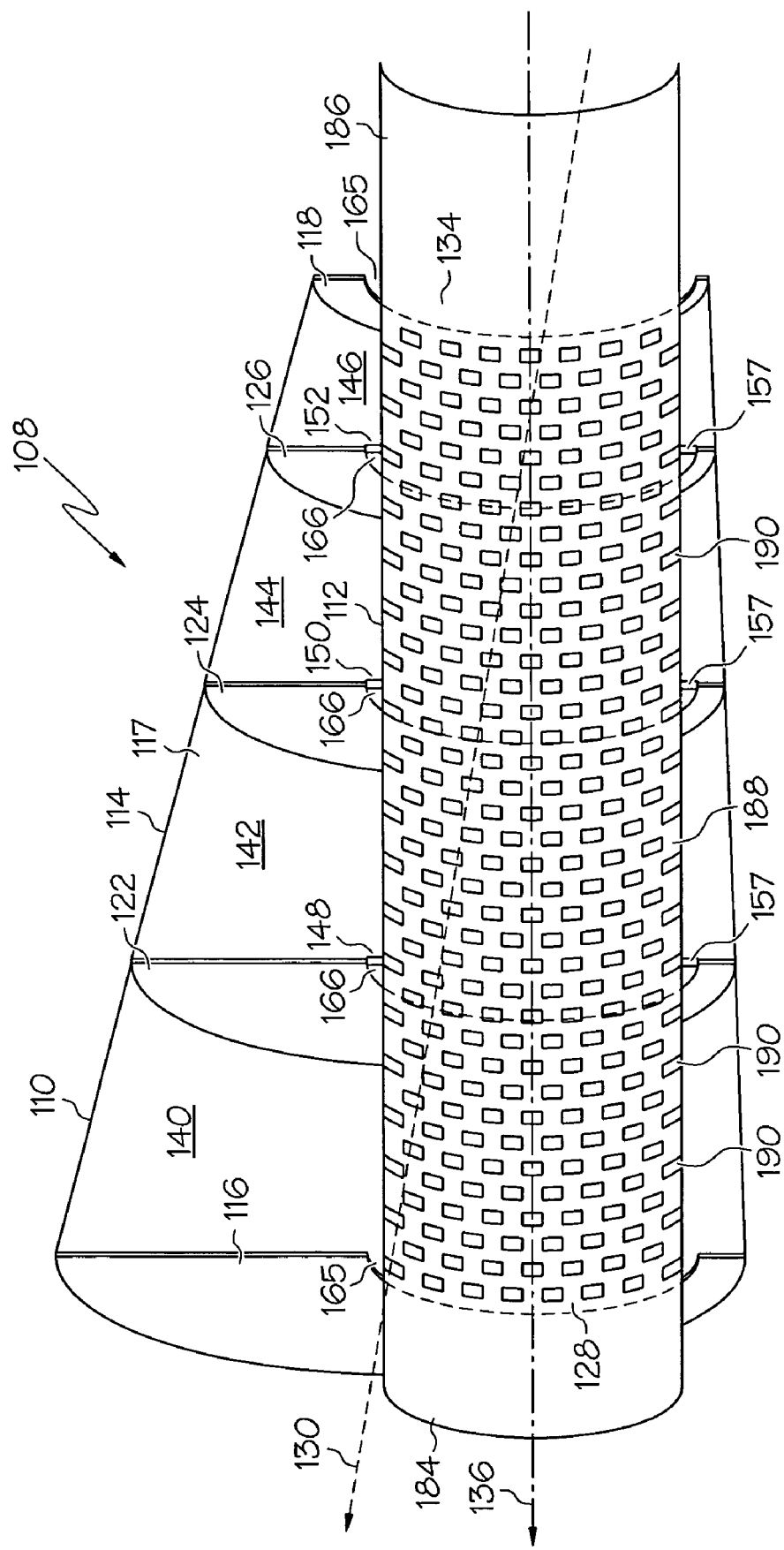
FIG. 4 is a cross-sectional perspective view of another exemplary muffler system.

As previously mentioned, the muffler system 108 may optionally include one or more baffles 122, 124, 126, as shown in FIG. 4. The annular baffles 122, 124, 126 divide the outer can 110 into a plurality of concentric chambers 140, 142, 144, 146. Each annular baffle 122, 124, 126 is disposed between the forward wall 116 and aft wall 118 and is coupled to and extends radially inward from the outer can sidewall 114.

Each annular baffle 122, 124, 126 also includes an opening 148, 150, 152 disposed about the second longitudinal axis 136. Each opening 148, 150, 152 is sufficiently sized to allow the tube 112 to extend therethrough and to provide a radials gap 166 therebetween. The radial gaps 166 allow the acoustic liner 188 to expand radially when exposed to APU 120 exhaust gases. Preferably, a compressible seal 157 is disposed in the radial gap 166 to isolate the chambers 140, 142, 144, 146 from one another and to further attenuate noise. The compressible seal 167 may be coupled to one or more of the tube 112 and the annular baffles 122, 124, 126. It will be appreciated that the compressible seal 167 may be any type of conventionally used seal capable of withstanding the temperatures of the APU 120 exhaust gases, such as the compressible seal 168 shown in FIG. 3.

Figure 5:
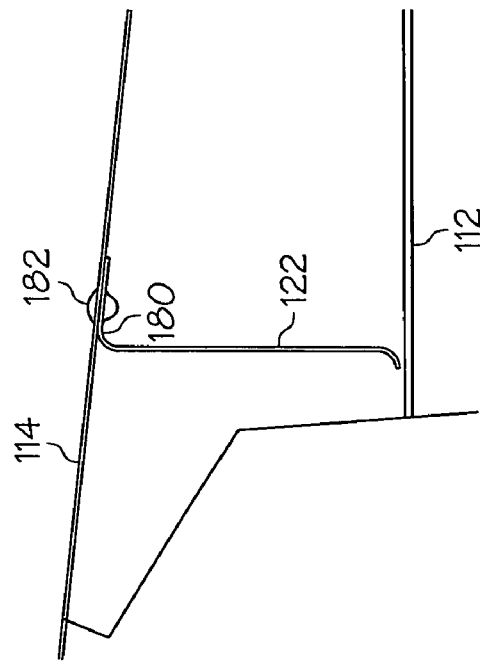
FIG. 5 is a close-up view of a section of an exemplary baffle that may be implemented into the muffler system depicted in FIG. 4.

The annular baffles 122, 124, 126 may be coupled to the sidewall 114 using any one of numerous techniques. In one exemplary embodiment, and as shown in FIG. 5, the annular baffle 122 includes an annular lip 180 that extends axially therefrom. A fixed joint 182 is disposed between the annular lip 180 and the sidewall 114 and is preferably coupled to each component. Alternatively, the annular baffle 122 includes an axial protrusion and the fixed joint 182 is coupled to the sidewall 114 and axial protrusion.

Returning to FIG. 4, because the outer can sidewall 114 has varying cross-sectional areas along its length and the tube 112 has a substantially uniform cross-sectional area along its length, the volume of each concentric chamber 140, 142, 144, 146 varies as well. For example, the chamber 140 adjacent to the forward wall 116 has a volume that is greater than the volume of the chamber adjacent the aft wall 118. In this regard, the muffler system 108 may provide further broadband acoustic tuning of noise that travels therethrough. Although three annular baffles 122, 124, 126 are described herein, it will be appreciated that any number of baffles may be included as part of the outer can 110.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A muffler system comprising:
    an outer can having a sidewall including a forward end, an aft end, and a cavity extending therebetween, the forward end of the sidewall disposed symmetrically about a first longitudinal axis, and the cavity having a first cross-sectional area proximate the forward end and a second cross-sectional area proximate the aft end that is smaller than the first cross-sectional area;
    an annular baffle coupled to and extending radially inward from the outer can sidewall, the annular baffle having an opening that is disposed symmetrically about a second longitudinal axis, the second longitudinal axis being non-coincident with the first longitudinal axis; and
    a tube extending through the annular baffle opening and spaced apart from the annular baffle to define a radial gap therebetween, the tube having a length and a substantially uniform cross-sectional area along the length and comprising acoustic material having a resistance of greater than zero.

2. The system of claim 1, wherein the outer can farther comprises a forward annular wall coupled to and extending radially inward from the outer can sidewall, the forward annular wall having an opening that is disposed about the second longitudinal axis.

3. The system of claim 2, wherein the outer can farther comprises an aft annular wall coupled to and extending radially inward from the outer can sidewall, the aft annular wall having an opening that is disposed about the second longitudinal axis.

4. The system of claim 1, wherein the outer can is conical.

5. The system of claim 1, further comprising at least one fixed joint coupled to an outer peripheral surface of the annular baffle.

6. The system of claim 1, further comprising a compressible seal disposed in the radial gap.

7. The system of claim 1, wherein the acoustic material comprises fiber metal.

8. The system of claim 1, wherein the acoustic material comprises perforated metal.

9. The system of claim 1, wherein the annular baffle is suspended from the outer can sidewall.

10. The system of claim 9, further comprising at least one fixed joint coupled between an outer peripheral surface of the annular baffle and the outer can sidewall.

11. A muffler system for use with an auxiliary power unit disposed in an aircraft, the system comprising:
    an outer can having a sidewall, a forward annular wall, an aft annular wall, and a cavity extending between the forward annular wall and the aft annular wall, the sidewall having a forward end and an aft end, the forward end disposed symmetrically about a first longitudinal axis, and the sidewall having a first section and a second section, the forward annular wall extending radially inward from the sidewall first section and including an opening formed therein that is disposed symmetrically about a second longitudinal axis, the second longitudinal axis being non-coincident with the first longitudinal axis, the aft annular wall extending radially inward from the sidewall second section and including an opening formed therein that is disposed about the second longitudinal axis, and the cavity having a first cross-sectional area proximate the forward end and a second cross-sectional area proximate the aft end that is smaller than the first cross-sectional area;
    an annular baffle extending radially inward from the outer can sidewall and disposed between the forward annular wall and the aft annular wall, the baffle having an opening disposed about the second longitudinal axis; and
    a tube extending through the annular baffle opening and spaced apart from the annular baffle to define a radial gap therebetween, the tube having a length and a substantially uniform cross-sectional area along the length and comprising acoustic material having a resistance of greater than zero.

12. The system of claim 11, further comprising a compressible seal disposed in the radial gap.

13. The system of claim 12, wherein the compressible seal is coupled to the outer can sidewall.

14. The system of claim 12, wherein the compressible seal is coupled to the tube.

15. The system of claim 11, wherein the acoustic material comprises fiber metal.

16. The system of claim 11, wherein the acoustic material comprises perforated metal.

17. A muffler system for use with an auxiliary power unit disposed in an aircraft, the aircraft having a sidewall, the system comprising:
    an outer can having a sidewall having a forward end, an aft end, and a cavity extending therebetween, the forward end disposed symmetrically about a first longitudinal axis, and the cavity having a first cross-sectional area proximate the forward end and a second cross-sectional area proximate the aft end that is smaller than the first cross-sectional area;
    a forward annular wall coupled to and extending radially inward from the outer can sidewall, the forward annular wall having an opening that is disposed symmetrically about a second longitudinal axis, the second longitudinal axis being non-coincident with the first longitudinal axis;
    an aft annular wall coupled to and extending radially inward from the outer can sidewall, the aft annular wall having an opening that is disposed about the second longitudinal axis;
    an annular baffle coupled to and extending radially inward from the outer can sidewall, the annular baffle disposed between the forward annular wall and the aft annular wall and having an opening that is disposed about the second longitudinal axis;

a tube extending through the annular baffle opening and spaced apart from the annular baffle to define a radial gap therebetween, the tube having a length and a substantially uniform cross-sectional area along the length and comprising acoustic material having a resistance of greater than zero; and a compressible seal disposed in the radial gap.

18. The system of claim 17, wherein the annular baffle is suspended from the outer can sidewall.

19. The system of claim 17, wherein the acoustic material comprises fiber metal.

20. The system of claim 17, wherein the acoustic material comprises perforated metal.

* * * * *